(12) United States Patent
Kamata et al.

(10) Patent No.: US 9,891,551 B2
(45) Date of Patent: Feb. 13, 2018

(54) ROLLER MEMBER, ROLLER SUPPORTING MECHANISM, AND IMAGE FORMING APPARATUS

(71) Applicant: CANON KABUSHIKI KAISHA, Tokyo (JP)

(72) Inventors: Kohki Kamata, Machida (JP); Motomi Suzuki, Kashiwa (JP); Haruyasu Ishikawa, Yokohama (JP); Makoto Nishino, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 15/216,436

(22) Filed: Jul. 21, 2016

(65) Prior Publication Data

US 2016/0327901 A1     Nov. 10, 2016

Related U.S. Application Data

(63) Continuation of application No. 14/673,545, filed on Mar. 30, 2015, now Pat. No. 9,423,715.

(30) Foreign Application Priority Data

Mar. 31, 2014 (JP) ................................ 2014-074540

(51) Int. Cl.
    *G03G 15/08*          (2006.01)
    *B21C 37/06*          (2006.01)
                      (Continued)

(52) U.S. Cl.
    CPC ....... *G03G 15/0818* (2013.01); *B21C 37/065* (2013.01); *G03G 15/0233* (2013.01);
                      (Continued)

(58) Field of Classification Search
    CPC ......................... B41J 13/076; Y10T 29/49565
                      (Continued)

(56) References Cited

U.S. PATENT DOCUMENTS 4,907,626 A      3/1990   Mori
7,610,938 B2 *   11/2009   Yanokura ............ B21C 37/0826
                                                         138/165

(Continued)

FOREIGN PATENT DOCUMENTS

JP       2010-230748 A     10/2010
JP       2011-110586 A      6/2011
JP       2013-109209 A      6/2013

*Primary Examiner* — Clayton E Laballe
*Assistant Examiner* — Leon W Rhodes, Jr.
(74) *Attorney, Agent, or Firm* — Canon USA, Inc., IP Division

(57) ABSTRACT

A roller member used in an image forming apparatus includes a metallic shaft, and the metallic shaft includes a cylindrical portion formed of a metallic plate, and a projecting portion projecting outward from end surfaces of the cylindrical portion, wherein end portions of the metallic plate each include a straight portion, projections, and depressions, the projections on the one end portion engage the depressions on the other end portion, the depressions on the one end portion engage the projections on the other end portion, and the straight portions on both end portions oppose each other, a straight area is positioned on an end portion of the cylindrical portion, a projection and depression area is located adjacent to the straight area, and a projecting amount of the projection with respect to the straight portion is smaller than a projecting amount of the projection with respect to the depression.

18 Claims, 18 Drawing Sheets

(51) Int. Cl.
 *G03G 15/00* (2006.01)
 *G03G 15/02* (2006.01)
 *B29C 65/00* (2006.01)

(52) U.S. Cl.
 CPC ..... *G03G 15/0806* (2013.01); *G03G 15/6552* (2013.01); *B29C 66/4322* (2013.01)

(58) Field of Classification Search
 USPC .......................................................... 72/367.1
 See application file for complete search history.

(56) References Cited

U.S. PATENT DOCUMENTS

| | | | |
|---|---|---|---|
| 8,596,779 B2 * | 12/2013 | Todoriki | ................. B41J 13/02 193/37 |
| 2007/0131015 A1 | 6/2007 | Matsumura | |
| 2013/0196836 A1 | 8/2013 | Ichizawa | |

\* cited by examiner

ROLLER MEMBER, ROLLER SUPPORTING MECHANISM, AND IMAGE FORMING APPARATUS

CROSS-REFERENCE TO RELATED APPLICATION

This application is a Continuation of U.S. application Ser. No. 14/673,545, filed Mar. 30, 2015, which claims priority from Japanese Patent Application No. 2014-074540 filed Mar. 31, 2014, which are hereby incorporated by reference herein in their entireties.

BACKGROUND OF THE INVENTION

Field of the Invention

This disclosure relates to a roller member used for an image forming apparatus, a roller supporting mechanism provided with the roller member, and the image forming apparatus.

An image forming apparatus is an apparatus that forms images on recording media. Examples of an electrophotographic image forming apparatus include, for example, electrophotographic copying machines, electrophotographic printers (LED printers, laser beam printers), facsimile apparatuses, and word processors.

Description of the Related Art

In the related art, an electrophotographic image forming apparatus (hereinafter, referred to as an image forming apparatus) is provided with a process device having a photosensitive drum (electrophotographic photosensitive drum), which is an image bearing member and configured to act on the photosensitive drum. Examples of the process device include a voltage application apparatus configured to apply electric charge on the photosensitive drum, a developing device configured to supply developer (hereinafter, referred to as "toner") to the photosensitive drum, and a cleaning device configured to clean toner failed to be transferred and remaining on a surface of the photosensitive drum.

Examples of a charging device in the voltage application apparatus include a roller charging system using a conductive roller. In the roller charging system, charging of the surface of the photosensitive drum is achieved by bringing a charging roller, which is a conductive resilient roller, into bias abutment with the photosensitive drum and applying a voltage thereto. The charging roller generally has a form having a resilient layer covering a metallic shaft over the entire area in a longitudinal direction other than both ends (Japanese Patent Laid-Open No. 2013-109209). Examples of the metallic shaft of the charging roller include a form using a cylindrical-shaped metallic shaft (Japanese Patent Laid-Open No. 2010-230748).

In the case of manufacturing the cylindrical-shaped metallic shaft by pressing a metallic plate, a mating portion (an opposing area where one end portion and the other end portion of the metallic plate oppose each other) extending in an axial direction is present on the metallic shaft. Here, in this configuration, in order to increase the strength of the metallic shaft, a configuration in which projections and depressions are provided alternately on the mating portion and one end portion and the other end portion of the metallic plate are engaged by the depressions and the projections is conceivable.

In this case, by providing the projections and the depressions on the mating portion (opposing area), dimensional accuracy in a radial and the longitudinal direction (axial direction) of the metallic shaft may be lowered at the time of manufacture of the metallic shaft.

Therefore, in the metallic shaft provided with the depressions and the projections in the opposing area of the metallic plate where the one end portion and the other end portion oppose each other, restraint of lowering of the dimensional accuracy of the metallic shaft is required.

SUMMARY OF THE INVENTION

A representative configuration disclosed in this application is a roller member used in an image forming apparatus including: a metallic shaft, the metallic shaft including: a cylindrical portion formed so that one end portion and the other end portion of a metallic plate oppose each other; and a projecting portion projecting from an end surface of the cylindrical portion outward in an axial direction of the metallic shaft, wherein the one end portion and the other end portion each include a straight portion, a plurality of projections, and a plurality of depressions, the projections on the one end portion engage the depressions on the other end portion, the depressions on the one end portion engage the projections on the other end portion, and the straight portion on the one end portion oppose the straight portion on the other end portion in an opposing area in which the one end portion and the other end portion oppose, a straight area in which the straight portion of the one end portion and the straight portion of the other end portion oppose is positioned on an end portion of the cylindrical portion, a projection and depression area in which the projections on the one end portion and the projections on the other end portion are arranged alternately is located adjacent to the straight area, and a projecting amount of the projection projecting with respect to the straight portion to which the projection arranged so as to be interposed between the straight portion and the depression is adjacent is smaller than a projecting amount of the projection projecting with respect to the depression to which the projection is adjacent.

Further features of the present invention will become apparent from the following description of exemplary embodiments with reference to the attached drawings.

DESCRIPTION OF THE EMBODIMENTS

Example 1

An embodiment of this disclosure will be described with reference to the drawings in detail below. A direction of a rotational axis of an electrophotographic photosensitive drum is defined as a longitudinal direction.

In the longitudinal direction, a side where the electrophotographic photosensitive drum receives a drive force from an image forming apparatus body is defined as a driving side (on a drive force receiving portion 63a side in FIG. 6), and a side opposite thereto is defined as a non-driving side.

Figure 2:
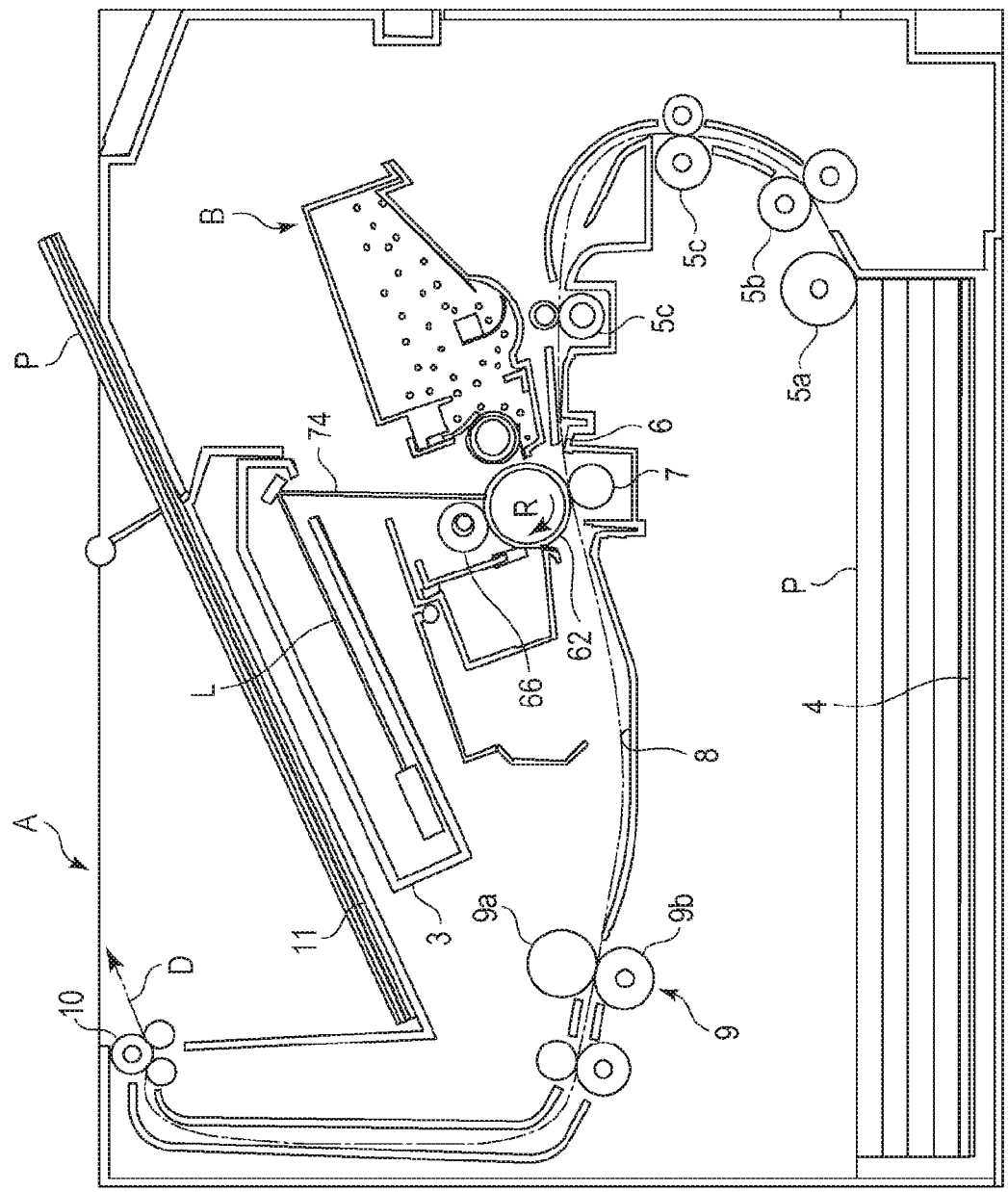
FIG. 2 is a cross-sectional view illustrating an image forming apparatus body and a process cartridge of an electrophotographic image forming apparatus of Example 1.
Figure 3:
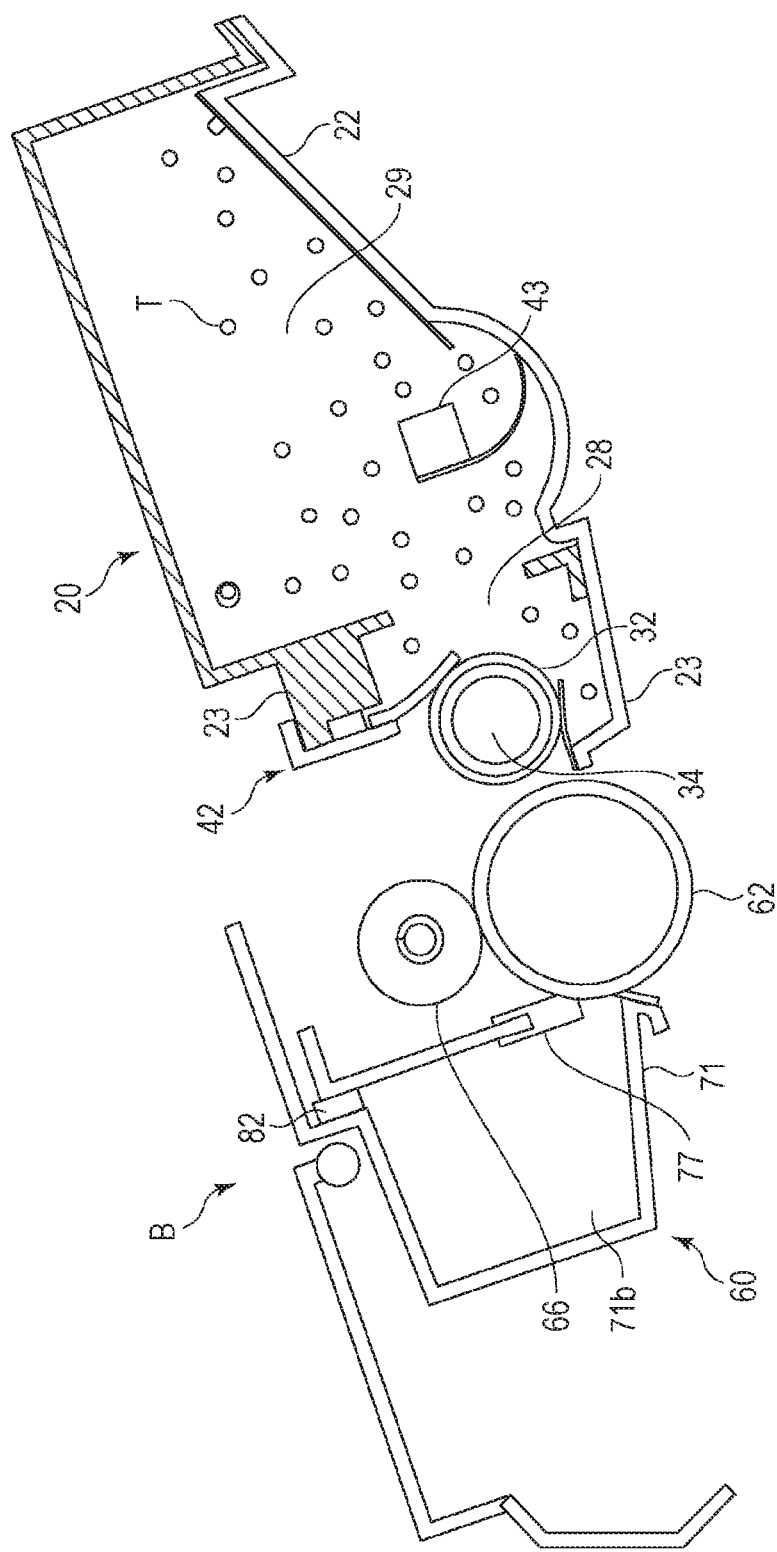
FIG. 3 is a cross-sectional view illustrating the process cartridge of Example 1.
Figure 4:
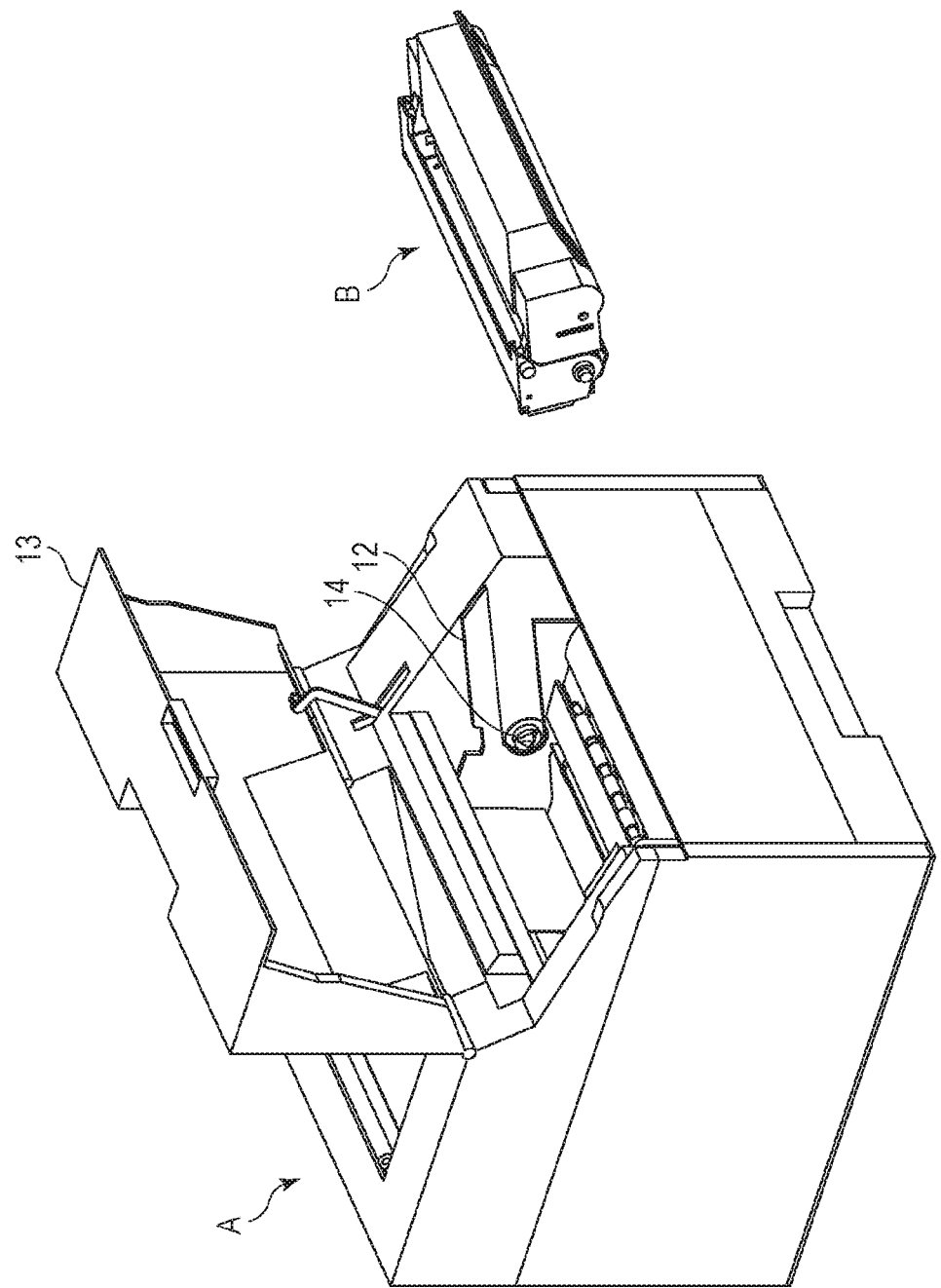
FIG. 4 is a perspective view illustrating the image forming apparatus body and the process cartridge of Example 1 in a state in which an opening and closing door is opened.

With reference to FIG. 2, FIG. 3, and FIG. 4, a general configuration and an image forming process will be described.

FIG. 2 is a cross-sectional view illustrating the image forming apparatus body (hereinafter, referred to as an apparatus body A) of the electrophotographic image forming apparatus and a process cartridge (hereinafter, referred to as a cartridge B) as an embodiment of this disclosure.

FIG. 3 is a cross-sectional view illustrating the cartridge B.

Here, the apparatus body A of the electrophotographic image forming apparatus is a portion of the electrophotographic image forming apparatus from which the cartridge B is removed.

FIG. 4 is a perspective view illustrating the image forming apparatus body A and the process cartridge B.

General Configuration of Electrophotographic Image Forming Apparatus

In FIG. 2 and FIG. 4, the electrophotographic image forming apparatus is a laser beam printer using an electrophotographic technology in which the cartridge B is demountably mounted on the apparatus body A. When the cartridge B is mounted on the apparatus body A, an exposure unit 3 (laser scanner unit) is arranged in an upper side of the cartridge B.

Also, a sheet tray 4 in which a recording medium (hereinafter, referred to as a sheet material P) as a target of image formation (a medium on which an image is to be recorded) is stored on a lower side of the cartridge B is arranged.

In addition, the apparatus body A includes a pickup roller 5a, a feed roller pair 5b, a conveyance roller pair 5c, a conveyance guide 6, a transfer roller 7, a conveyance guide 8, a fixing unit 9, a discharging roller pair 10, and a discharge tray 11 arranged in sequence along a direction of conveyance of the sheet material P. The fixing unit 9 includes a heat roller 9a and a pressurizing roller 9b.

Image Forming Process

Subsequently, the image forming process is described schematically. On the basis of a print start signal, the electrophotographic photosensitive drum (hereinafter, referred to as a drum 62) is driven to rotate at a predetermined circumferential velocity (process speed) in a direction indicated by an arrow R.

A charging roller 66 to which a bias voltage is applied, comes into contact with an outer peripheral surface of the drum 62, and charges the outer peripheral surface of the drum 62 uniformly and evenly. The charging roller 66 is a conductive roller member (conductive roller).

The exposure unit 3 outputs a laser beam L in accordance with image information. The laser beam L passes through an exposure window portion 74 on an upper surface of the cartridge B, and scans and exposes the outer peripheral surface of the drum 62.

Accordingly, an electrostatic latent image corresponding to the image information is formed on the outer peripheral surface of the drum 62.

In contrast, as illustrated in FIG. 3, in a developing device unit 20 as a developing apparatus, toner T in a toner chamber 29 is stirred and conveyed by a rotation of a conveyance member 43 and fed to a toner supply chamber 28. The toner T is born on a surface of a developing roller 32 by a magnetic force of a magnet roller 34 (fixed magnet). The toner T is controlled in layer thickness on a peripheral surface of the developing roller 32 while being charged by friction by a developing blade 42.

The toner T is transferred to the drum 62 in accordance with the electrostatic latent image, and is visualized as a toner image. The drum 62 is an image bearing member configured to bear images (a toner image, a developer image) on the surface thereof. The developing roller 32 is a developer bearing member configured to bear developer (toner) for developing a latent image formed on the drum 62 as a toner image (developer image).

As illustrated in FIG. 2, the sheet material P stored in a lower portion of the apparatus body A is fed from the sheet tray 4 by the pickup roller 5a, the feed roller pair 5b, and the conveyance roller pair 5c at the same timing as outputting of the laser beam L. The pickup roller 5a, the feed roller pair 5b, and the conveyance roller pair 5c are a conveyance mechanism configured to convey the recording medium (sheet material P).

Then, the sheet material P passes through the conveyance guide 6, and is fed to a transfer position between the drum 62 and the transfer roller 7. At this transfer position, the toner images are transferred in sequence from the drum 62 to the sheet material P.

The sheet material P to which the toner image is transferred is separated from the drum 62 and conveyed to the fixing unit 9 along the conveyance guide 8. The sheet material P then passes through a nip portion between the heat roller 9a and the pressurizing roller 9b which constitute part of the fixing unit 9.

At the nip portion, pressurization and heat-fixation are performed, so that the toner image is fixed to the sheet material P. The sheet material P subjected to the fixation of the toner image is conveyed to the discharging roller pair 10, and is discharged to the discharge tray 11.

In contrast, as illustrated in FIG. 3, residual toner on the outer peripheral surface of the drum 62 after the transfer is removed by a cleaning blade 77, and the drum 62 is used for the image forming process again. The toner removed from the drum 62 is stored in a waste toner chamber 71*b* of a cleaning unit 60.

In the above, the charging roller 66, the developing roller 32, and the cleaning blade 77 are process devices configured to act on the drum 62.

General Configuration of Cartridge

Subsequently, a general configuration of the cartridge B will be described with reference to FIG. 3 and FIG. 5.

Figure 5:
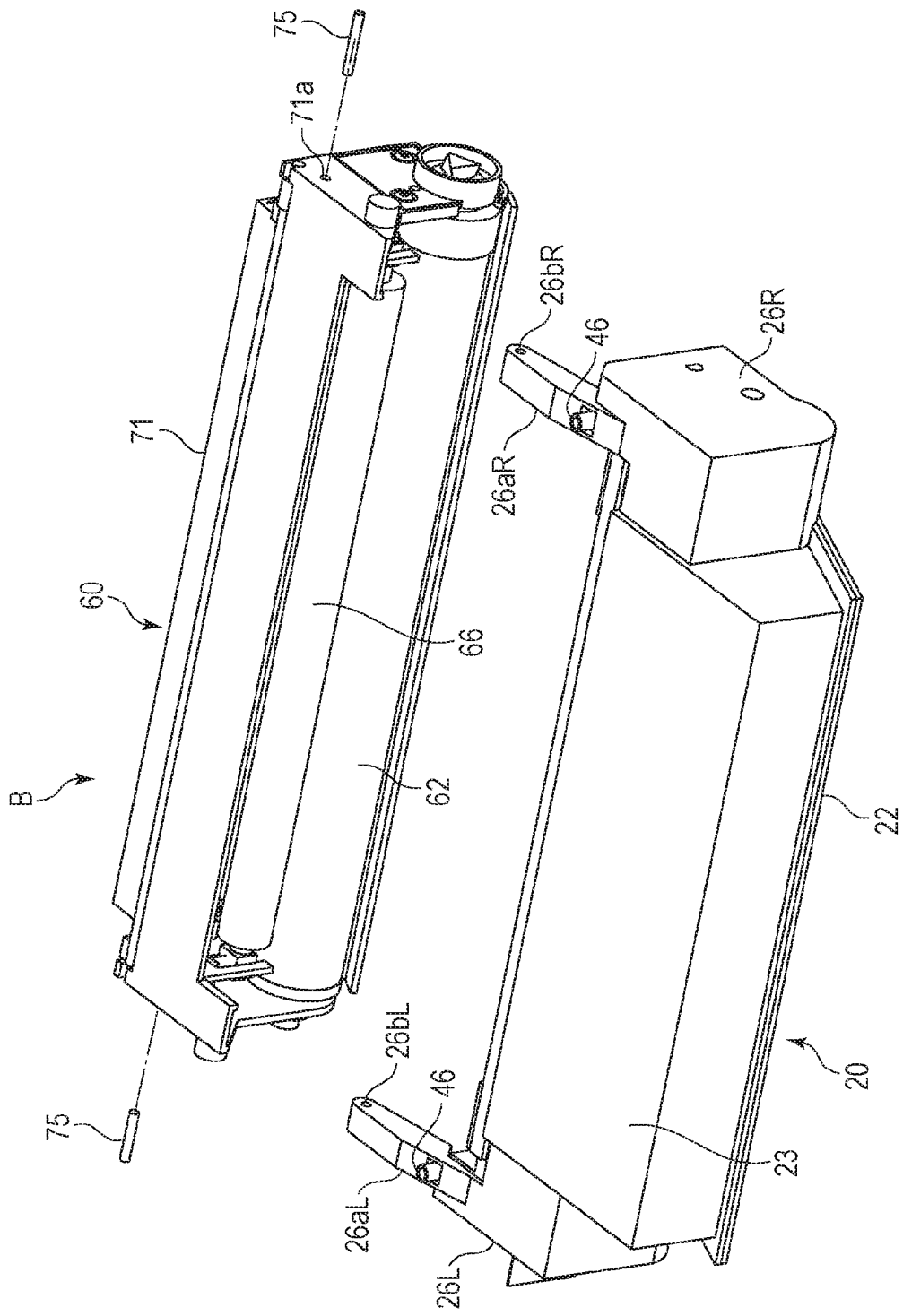
FIG. 5 is an explanatory perspective view illustrating a configuration of the process cartridge of Example 1.

FIG. 5 is an explanatory perspective view illustrating a configuration of the cartridge B.

The cartridge B includes the cleaning unit 60 and the developing device unit 20 combined with each other.

The cleaning unit 60 includes a cleaning frame member 71, the drum 62, the charging roller 66, and the cleaning blade 77.

In contrast, the developing device unit 20 includes a bottom member 22, a developer container 23, a first side member 26L, a second side member 26R, the developing blade 42, the developing roller 32, the magnet roller 34, the conveyance member 43, the toner T, and biasing members 46.

The cartridge B is formed by coupling the cleaning unit 60 and the developing device unit 20 with a coupling member 75 so as to be rotatable with each other.

Specifically, rotary hole 26*b*L and 26*b*R, extending in parallel with the developing roller 32, are formed at distal ends of arm portions 26*a*L and 26*a*R formed on the first side member 26L and the second side member 26R provided on the developing device unit 20 at both end portions thereof in a longitudinal direction (an axial direction of the developing roller 32).

Fitting holes 71*a* for fitting coupling members 75 are formed at both end portions of the cleaning frame member 71 in a longitudinal direction.

The arm portion 26*a*L and 26*a*R are aligned with predetermined positions of the cleaning frame member 71 to insert the coupling member 75 into the rotary holes 26*b*L and 26*b*R and the fitting hole 71*a*. Accordingly, the cleaning unit 60 and the developing device unit 20 are coupled so as to be rotatable about the coupling member 75 as a center.

At this time, the biasing members 46 mounted at roots of the arm portions 26*a*L and 26*a*R abut against the cleaning frame member 71, thereby biasing the developing device unit 20 toward the cleaning unit 60 about the coupling members 75 as a center of rotation.

Accordingly, the developing roller 32 is reliably pressed in the direction of the drum 62.

With distance retaining members (which are not illustrated) mounted on both end portions of the developing roller 32, the developing roller 32 is retained at a predetermined distance from the drum 62.

Configuration of Cleaning Unit

Subsequently, a configuration of the cleaning unit 60 will be described with reference to FIG. 6, FIGS. 7A and 7B, and FIG. 8.

Figure 6:
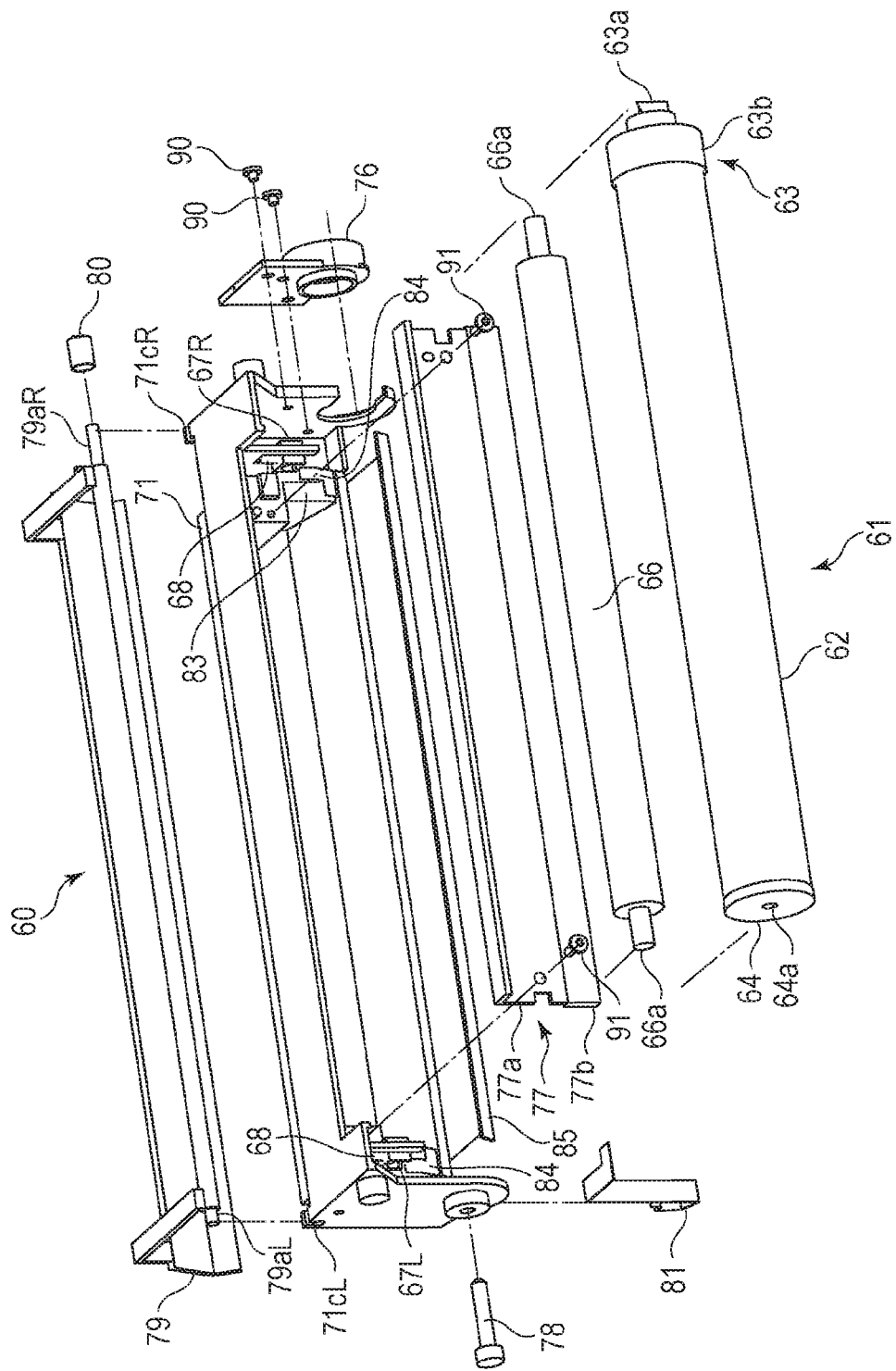
FIG. 6 is an explanatory perspective view illustrating a configuration of a cleaning unit of Example 1.

FIG. 6 is an explanatory perspective view illustrating the configuration of the cleaning unit 60.

Figure 7A:
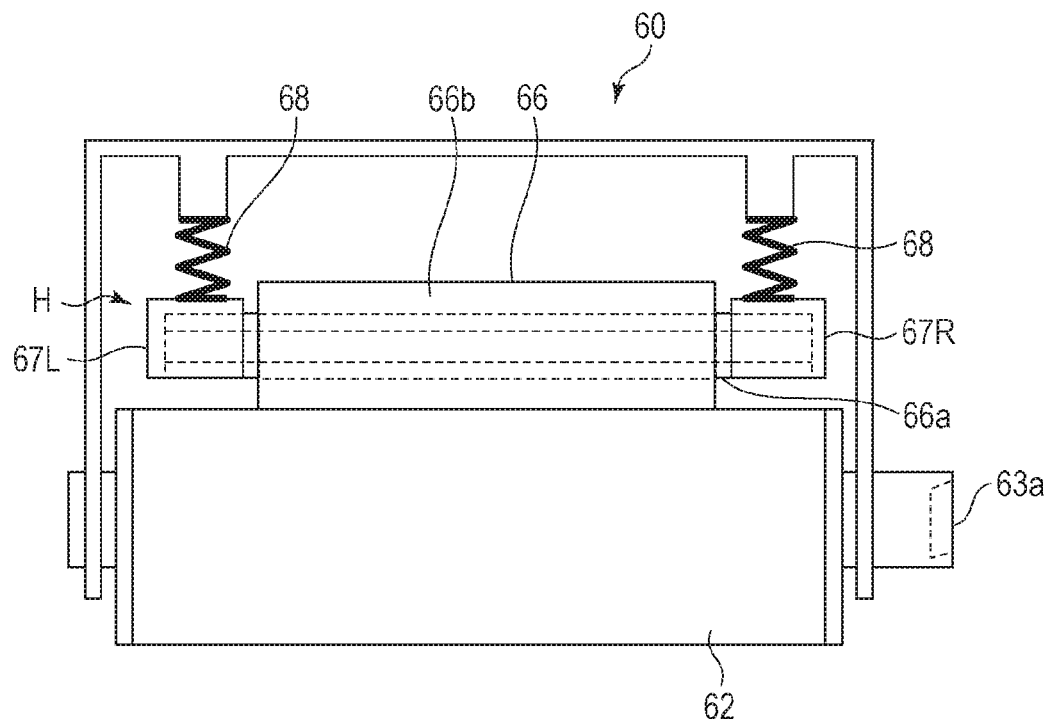
FIGS. 7A and 7B are explanatory views illustrating the configuration of the cleaning unit of Example 1.
Figure 7B:
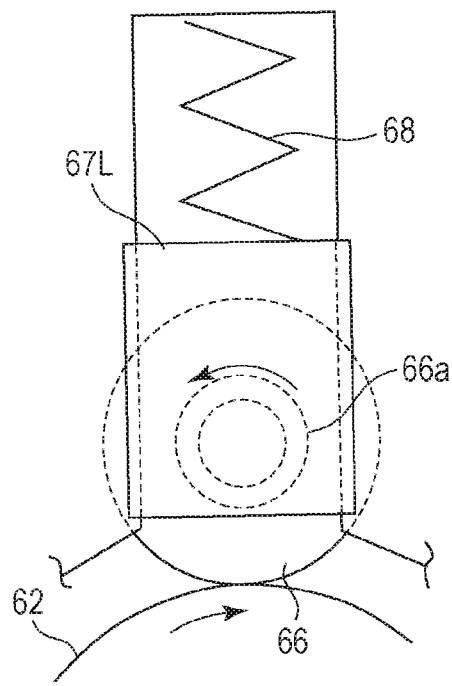
Figure 8:
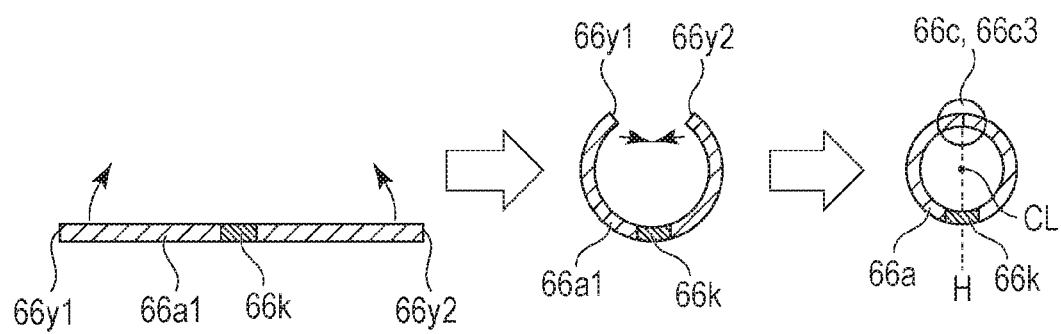
FIG. 8 is an explanatory cross-sectional view illustrating a processing process of a charging roller of Example 1.

FIG. 7A is an explanatory front view illustrating the configuration of the cleaning unit 60. FIG. 7B is a drawing of a supporting portion of the charging roller 66 viewed in a direction indicated by an arrow H. FIG. 8 is a cross-sectional view illustrating a process of formation of a shaft portion 66*a* from a plate into a cylindrical shape.

The cleaning blade 77 includes a supporting member 77*a* formed of a plate and a resilient member 77*b* formed of a resilient material such as urethane rubber, and is arranged at a predetermined position in the cleaning frame member 71 by fixing both ends of the supporting member 77*a* with screws 91.

Resilient member 77*b* comes into abutment with the drum 62, and removes residual toner from the outer peripheral surface of the drum 62. The removed toner is stored in a waste toner chamber 71*b* (FIG. 3) of the cleaning unit 60.

A first seal member 82, a second seal member 83, a third seal member 84, and a fourth seal member 85 are fixed to predetermined positions of the cleaning frame member 71 with double-sided tape and the like.

The first seal member 82 is provided across the longitudinal direction and prevents wasted toner from leaking from a back side of the supporting member 77*a* of the cleaning blade 77.

The second seal member 83 prevents wasted toner from leaking from both ends of the resilient member 77*b* of the cleaning blade 77 in the longitudinal direction.

The third seal member 84 wipes adhered substances such as toner on the drum 62 while preventing the wasted toner from the leaking out from the both ends of the resilient member 77*b* of the cleaning blade 77 in the longitudinal direction.

The fourth seal member 85 is provided in contact with the drum 62 across the longitudinal direction, and prevents the wasted toner from leaking out from the upstream side of the drum 62 in a direction of rotation with respect to the cleaning blade 77.

An electrode plate 81, a biasing member 68, and charging roller bearings 67L and 67R are mounted on the cleaning frame member 71.

A metallic shaft (hereinafter, referred to as the shaft portion 66*a*) of the charging roller 66 is fitted to the charging roller bearings 67L and 67R.

The charging roller 66 is biased by the biasing member 68 with respect to the drum 62, and is rotatably supported by the charging roller bearings (bearing portions) 67L and 67R. The biasing member 68 is driven to rotate in association with the rotation of the drum 62. In other words, the charging roller 66 is supported by the cleaning unit 60 via the charging roller bearings 67 (67L and 67R). The cleaning unit 60 is a roller supporting mechanism configured to support the charging roller 66.

The charging roller 66 is configured by covering the hollow shaft portion 66*a* with a conductive resilient layer (covering layer, covering member) 66*b* over the entire area in the longitudinal direction except for both ends. The shaft portion 66*a* is a cylindrical portion having a cylindrical shape (roller shape). The shaft portion 66*a* is a metallic shaft formed of a metal and having conductivity.

The resilient layer 66*b* and the shaft portion 66*a* are joined by an adhesive agent. The shaft portion 66*a* is a member formed by shaping a conductive metallic plate such as a stainless steel plate or a galvanized steel plate into a cylindrical shape by a press work.

Here, using the hollow shaft portion 66*a* formed by a press work is used is to achieve a weight reduction of the charging roller 66, the cartridge having the charging roller 66, and the image forming apparatus by reducing the weight of the shaft portion 66*a*. If the shaft portion 66*a* can be formed by processing the metallic plate, a cost reduction of the shaft portion 66*a* is achieved.

The electrode plate 81, the biasing member 68, the charging roller bearing 67L, and the shaft portion 66*a* have conductivity. The electrode plate 81 is in contact with a power feeding portion (which is not illustrated) of the apparatus body A. With these members using as a power feeding route, power is supplied to the charging roller 66.

The drum 62 is coupled integrally with a flange 64 and a flange 63 to achieve an electrophotographic photosensitive drum unit (hereinafter, referred to as a drum unit 61). This coupling method uses caulking, adhesion, welding, and the like.

An earth contact point and the like (which is not illustrated) is coupled to the flange 64. The flange 63 includes a drive force receiving portion 63a configured to receive a drive force from the apparatus body A and a flange gear portion 63b configured to transmit the drive force to the developing roller 32.

A bearing member 76 is integrally fixed to a driving side of the cleaning frame member 71 with a screw 90, and a drum shaft 78 is fixed to a non-driving side of the cleaning frame member 71 by press fitting.

The bearing member 76 fits the flange 63, and the drum shaft 78 fits a hole 64a of the flange 64.

Accordingly, the drum unit 61 is rotatably supported by the cleaning frame member 71.

A protecting member 79 is rotatably supported by the cleaning frame member 71 so that protection (light-shielding) of the drum 62 and exposure are allowed.

A biasing member 80 is mounted on a shaft portion 79aR on a driving side of the protecting member 79, and biases the protecting member 79 in a direction to protect the drum 62.

A shaft portion 79aL on a non-driving side and the shaft portion 79aR on the driving side of the protecting member 79 fit bearing portions 71cL and 71cR of the cleaning frame member 71.

Configuration of Charging Roller

A configuration of the charging roller 66 will be described with reference to FIG. 1, FIG. 8, FIGS. 9A and 9B, FIG. 10, FIGS. 11A and 11B, FIG. 14, FIGS. 15A and 15B, FIG. 16, FIG. 17, and FIGS. 18A and 18B.

Figure 1:
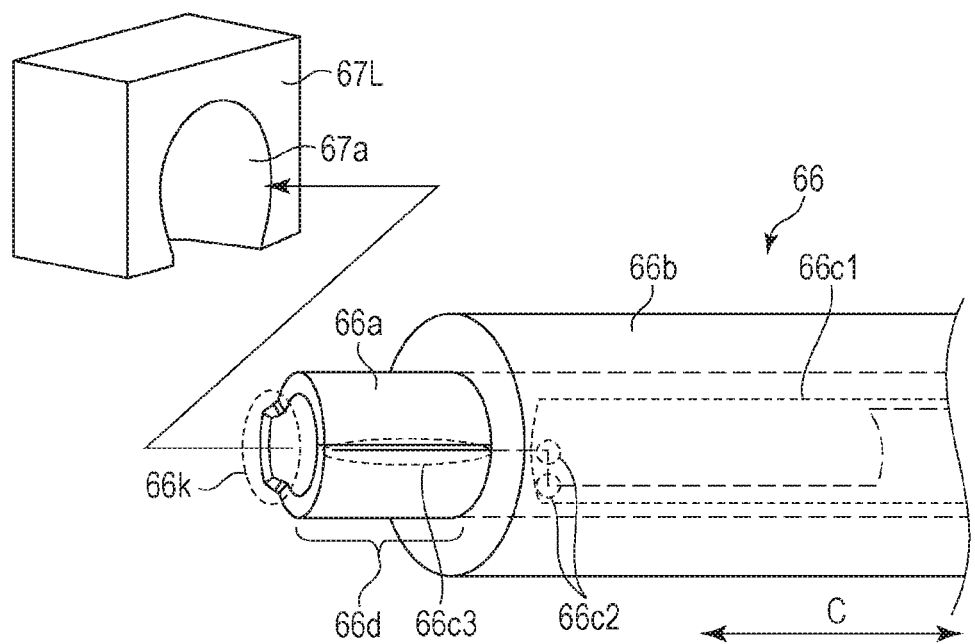
FIG. 1 is a perspective view illustrating a charging roller of Example 1.
Figure 9A:
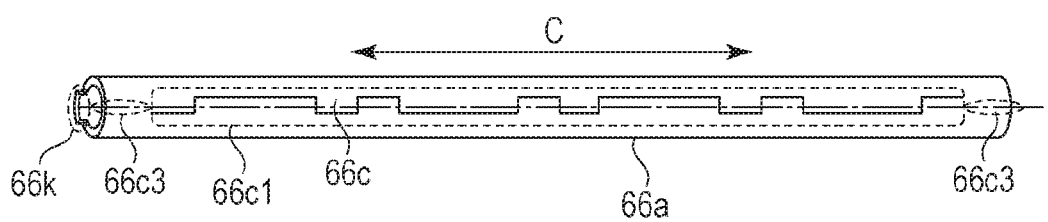
FIGS. 9A and 9B are explanatory views illustrating a shaft portion of the charging roller of Example 1.
Figure 9B:
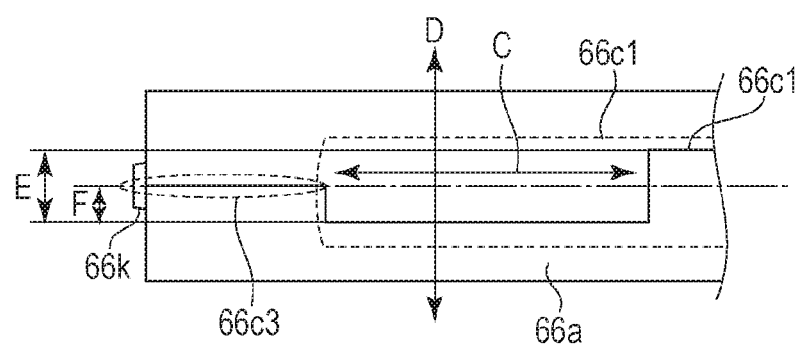

FIG. 1 is a perspective view illustrating the charging roller 66 and the charging roller bearing 67L. FIG. 9A is a perspective view illustrating the shaft portion 66a. FIG. 9B is a detailed drawing illustrating an end portion 66d of the shaft portion 66a of the charging roller 66.

Figure 10:
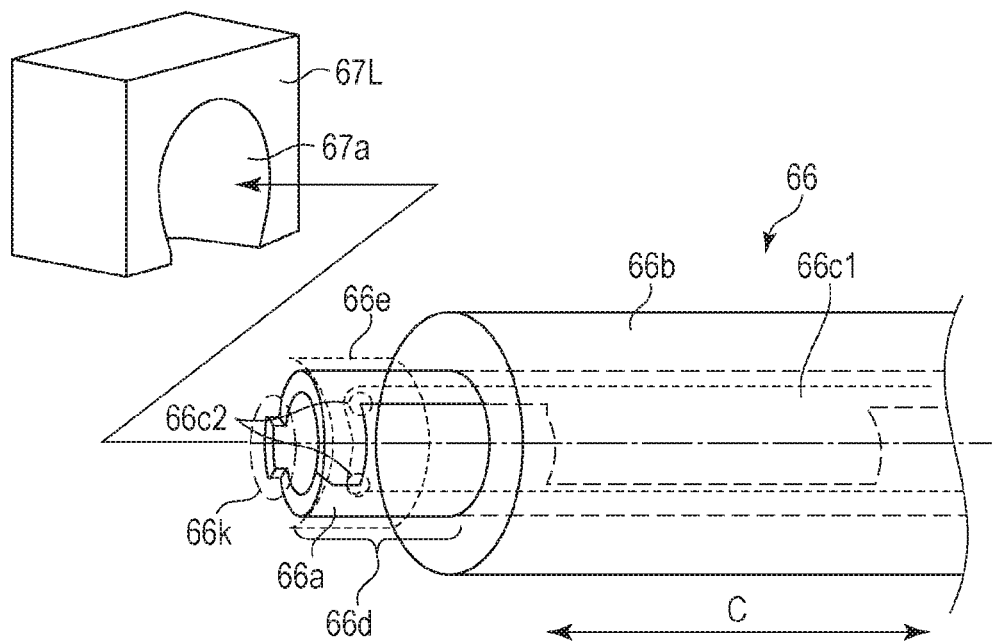
FIG. 10 is an explanatory view illustrating the charging roller.
Figure 11A:
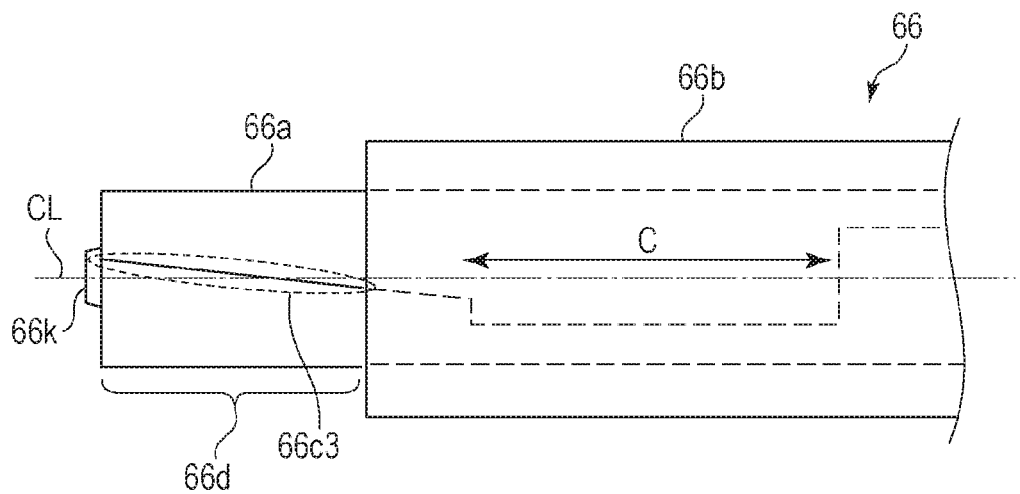
FIGS. 11A and 11B are explanatory views illustrating the charging roller of Example 1.
Figure 11B:
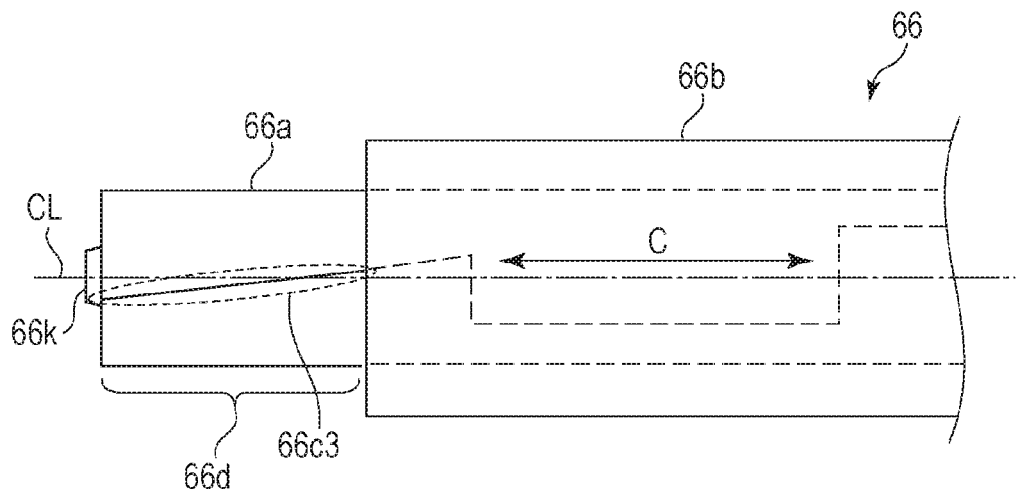
Figure 14:
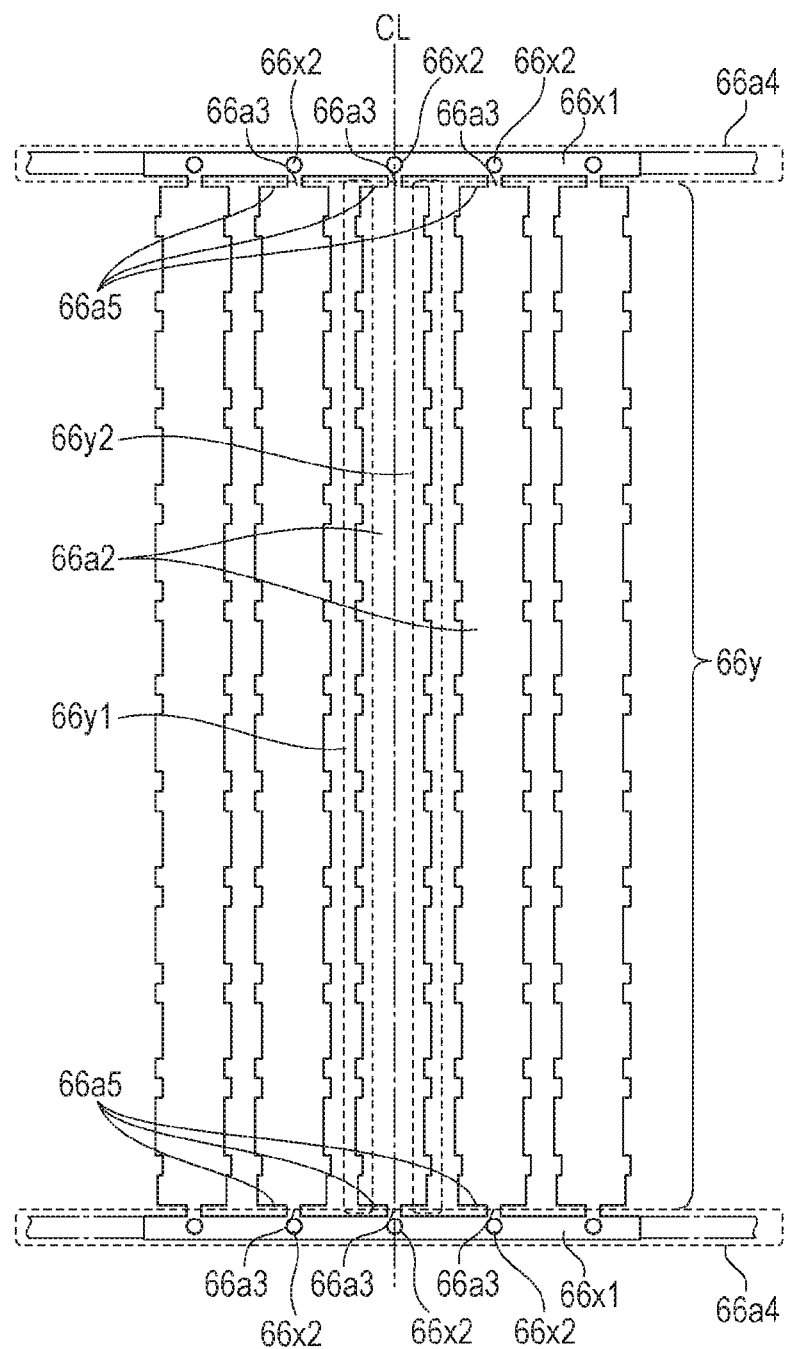
FIG. 14 is a deployed layout drawing illustrating a metallic plate of Example 1.

FIG. 10 is a perspective view illustrating the charging roller 66 and the charging roller bearing 67L as the comparative example with respect to this example. FIGS. 11A and 11B are detailed drawings illustrating the end portion 66d of the shaft portion 66a of the charging roller 66. FIG. 14 is a developed layout drawing illustrating the shaft portion 66a.

Figure 15A:
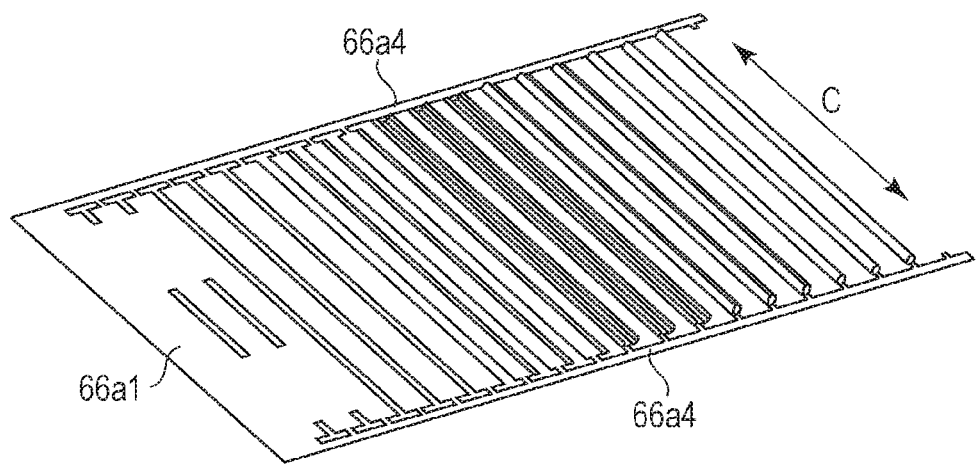
FIGS. 15A and 15B are process layout drawings illustrating a normal feed press work for forming the metallic plate into a cylindrical shape.
Figure 15B:
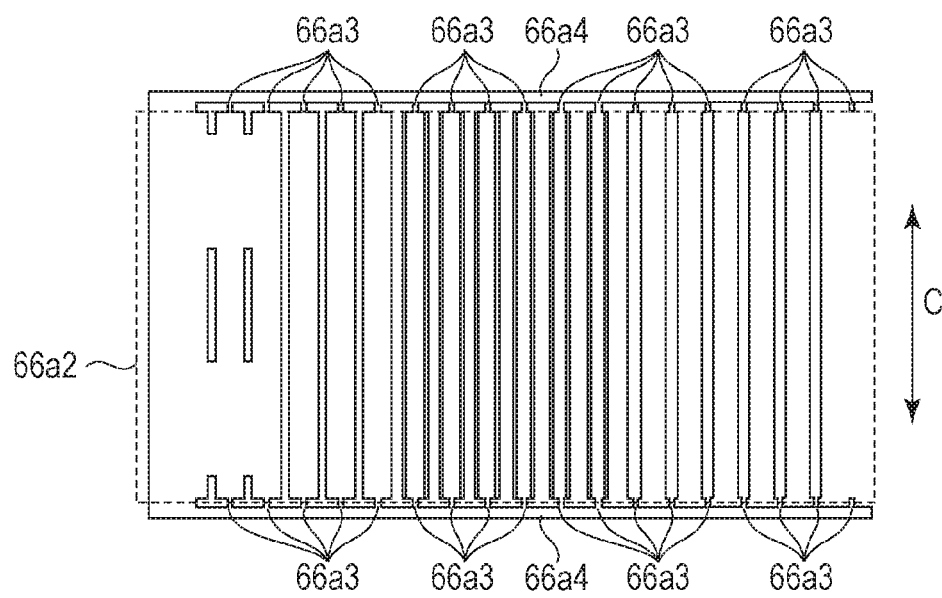

FIG. 15A is a perspective view illustrating a process layout of a normal feed press work for forming the metallic plate into a cylindrical shape. FIG. 15B is a plan view illustrating the process layout of the normal feed press work for forming the metallic plate into the cylindrical shape.

Figure 16:
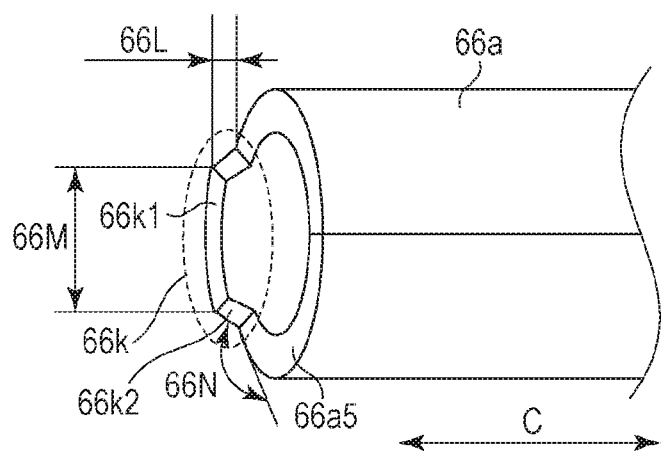
FIG. 16 is a detailed drawing illustrating an end portion of a shaft portion of the charging roller of Example 1.
Figure 17:
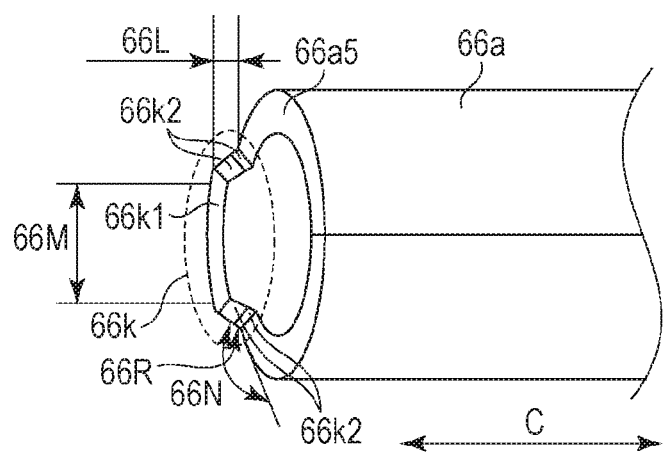
FIG. 17 is a detailed drawing illustrating the end portion of the shaft portion of the charging roller of another form of Example 1.
Figure 18A:
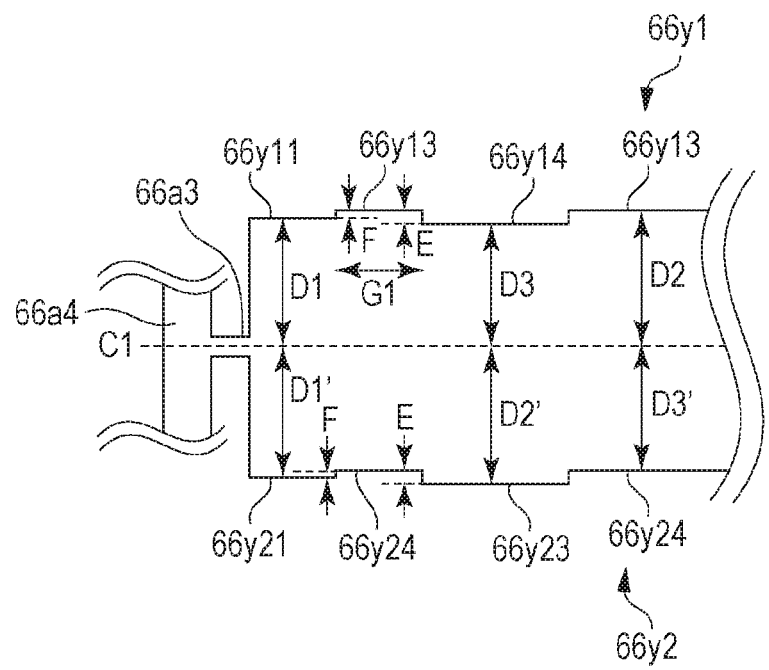
FIG. 18A is an enlarged view illustrating the metallic plate of Example 1.

FIG. 16 is a detailed drawing illustrating an end portion of the shaft portion 66a of the charging roller 66 of Example 1. FIG. 17 is a detailed drawing illustrating the end portion of the shaft portion 66a of the charging roller of another form of Example 1. FIG. 18A is a partially enlarged view illustrating the metallic plate.

The shaft portion 66a of the charging roller 66 as illustrated in FIG. 8 is a member formed by shaping into a cylindrical shape in outer diameter by pressing a conductive metallic plate 66a1, and includes a mating portion 66c of the metallic plate in an axial direction C of the shaft portion 66a. The metallic plate 66a1 is bent so that a long side 66y1 at one end portion (first end portion) and a long side 66y2 at the other end portion (second end portion) so as to oppose each other and is formed into a cylindrical shape (roller shape). An area in which the long side 66y1 at the one end portion and the long side 66y2 at the other end portion oppose (opposing area) corresponds to the mating portion 66c in the shaft portion 66a. Detailed description will be given later.

Here, in this example, an outer diameter of the shaft portion 66a is φ6 mm, the entire length in the axial direction C is 252.5 mm. An outer diameter and the entire length required in terms of function may be selected as needed.

With the provision of a projection and depression area 66c1 including a plurality of depressions and projections on the mating portion 66c, a desired strength is provided on the shaft portion 66a. The larger the number of projections and depressions, the stronger the shaft portion becomes, which is preferable. However, the strength required in terms of the function of the product may be selected as needed.

Here, the mating portion 66c has the projection and depression area 66c1 and straight areas 66c3 as illustrated in FIG. 9A and FIG. 9B. The straight areas 66c3 are provided on both sides (both end sides) of the shaft portion 66a in the axial direction C, and the projection and depression area 66c1 is provided between two of the straight areas 66c3.

As illustrated in FIG. 9B, in a vertical direction D with respect to the axial direction C of the shaft portion 66a, a relationship between a projecting amount (=depressing amount) E of the projection and depression area 66c1 of the mating portion 66c and a projecting amount F of the straight areas 66c3 is E>F.

In this example, the value E of the shaft portion is 2 mm, and the value F is half the value E, which is 1 mm (F=E/2). However, the value E may be a desired value selected in a range from 1 to 3 mm, and the value F may be selected in accordance with the value E.

Here, as illustrated in FIG. 1, corner portions (portions at recessed corners of the depressions and portions at projecting corners of the projections) 66c2 of the projection and depression area 66c1 are arranged so as to be covered entirely with the resilient layer (covering member) 66b. With this arrangement, the corner portions 66c2 are not exposed to the end portions 66d of the shaft portions 66a which is not covered with the resilient layer 66b. Therefore, sliding portions 67a of the charging roller bearings 67L and 67R and the corner portions 66c2 do not overlap with each other.

If the corner portions 66c2 come into contact with the charging roller bearing 67 (67R and 67L), the corner portions 66c2 are caught by the charging roller 66, which may cause abrasion of the charging roller bearing 67 or prevention of smooth rotation of the charging roller 66. Therefore, in the configuration of this example, the corner portions 66c2 are not exposed.

Description of Metallic Plate 66a1

FIG. 14 is a plan view illustrating the metallic plate 66a1 as a base material of the shaft portion 66a. In order to manufacture the shaft portion 66a, as illustrated in FIG. 14, the metallic plate 66a1 having a width larger than the entire length in the axial direction C such as a cold rolling steel plate, a galvanized steel plate, or a stainless steel plate having a thickness on the order of 0.6 mm is used as a row material. The metallic plate is pressed (punched) to form the following portions.

In other words, (1) frame portions 66x1 extending along the direction of conveyance of the metallic plate, (2) belt shaped flat plates (portions formed into a cylindrical shape, cylindrical shaped portions) 66a2 extending in a direction which intersects the direction of conveyance, and (3) connecting portions 66a3 configured to connect the frame portions 66x1 and the cylindrical shaped portions 66a2. Areas combining the frame portions 66x1 and the connecting portions 66a3 are referred to specifically as cross pieces 66a4.

In this embodiment, the cylindrical shaped portions 66a2 have a substantially rectangular shape. The short sides 66x3 that an end surface of the shaft portion of the charging roller extend substantially parallel to the direction of conveyance of the metallic plate 66a1. In contrast, long sides 66y of the cylindrical shaped portion 66a2 are substantially orthogonal to the direction of conveyance. The long sides 66y are provided with two sides (66y1 and 66y2) having depressions and projections respectively so as to form the projection and depression area 66c1 of the shaft portion 66a by punching the metallic plate 66a1.

The numbers of the depressions and the projections on the long sides 66y (66y1 and 66y2) satisfy the following relationship. In other words, the number of the projections provided on the long side (one end portion of the cylindrical shaped portion 66a2) 66y1 and the number of the projections provided on the long side (the other end portion of the cylindrical shaped portion 66a2) 66y2 are equivalent (the same number).

Therefore, the number of the depressions of the long side 66y1 that engage the projections of the long side 66y2 and the number of the depressions of the long side 66y2 that engage the projections of the long side 66y1 are also equivalent.

In FIG. 14, the number of the projections provided on the long side 66y1 is 15, and the number of the projections provided on the long side 66y2 is 15. (In other words, the number of the depressions provided on the long side 66y1 and the long side 66y2 are 15 respectively).

Straight portions adjacent to the connecting portions 66a3 and forming the straight areas 66c3 (see FIGS. 9A and 9B) have the same shape and dimensions as the long side 66y1 and the long side 66y2.

In this manner, in this example, the cylindrical shaped portion 66a2 and the connecting portions 66a3 are punched so as to have a shape close to symmetry with respect to a center line CL passing through a center of the cylindrical shaped portion 66a2.

More specifically, the connecting portions 66a3 are positioned on the center line CL, and the volumes of the cylindrical shaped portion 66a2 on both sides of the center line CL are substantially the same (substantially equivalent).

The connecting portions 66a3 here are used as reference positions in the bending process to form the cylindrical shaped portion 66a2 into a cylindrical shape. In other words, the cylindrical shaped portion 66a2 is bent so that a pair of the connecting portions 66a3 provided on both ends of the cylindrical shaped portion 66a2 come to an intermediate position of bending.

The frame portions 66x1 are provided with positioning holes 66x2 on the center line CL. The positioning holes 66x2 are used for positioning the metallic plate 66a1 when conveying the metallic plate 66a1.

FIGS. 15A and 15B are drawings of the metallic plate 66a1 illustrating a process in which the metallic plate 66a1 is bent into a cylindrical shape by a press work in sequence and formed into the shaft portion 66a of the charging roller 66. On the basis of FIGS. 15A and 15B, a method of manufacturing the shaft portion 66a has been described with an example of the normal feeding process, which is a general method of press work.

By pressing the metallic plate 66a1 conveyed by the cross pieces 66a4 repeatedly, the cylindrical shaped portion 66a2 is punched and subsequently, is formed into the cylindrical shape in sequence from step to step.

As described above, when pressing and bending a center portion of the cylindrical shaped portion 66a2, the connecting portion 66a3 is used as the reference position of bending.

The number of projections provided on the long side 66y1 and the number of projections of the long side 66y2 are the same. More specifically, all of the number of the depressions provided on the long side 66y1, the number of the projections provided on the long side 66y1, the number of the depressions provided on the long side 66y2, and the number of the projections provided on the long side 66y2 are the same.

Since the number of the projections (depressions) are uniform (the same number) on the long sides 66y1 and 66y2, the cylindrical shaped portion 66a2 may be bent evenly on the left side and the right side (lateral symmetry) with reference to the connecting portions 66a3.

Since bending is performed evenly on the left side and the right side with reference to the connecting portions 66a3, the shaft portion 66a is formed substantially parallel with respect to the center axis CL of the cylindrical shaped portion 66a2. Therefore, when bending the cylindrical shaped portion 66a2, the cylindrical shaped portion 66a2 is prevented from easily inclining and rotating. The cylindrical shaped portion 66a2 may be bent with high degree of accuracy and formed into a cylindrical shape.

In this example, the straight areas 66c3 of the mating portion 66c extend parallel to an axial line of the shaft portion 66a (see FIG. 1). However, as the configuration illustrated in FIGS. 11A and 11B, the straight areas 66c3 may be arranged obliquely with respect to the axial line. However, the straight areas 66c3 are preferably arranged in parallel as illustrated in FIG. 1 in order to improve a symmetric property of the cylindrical shaped portion 66a2 (see FIG. 14) and improve the degree of accuracy of the shaft portion 66a.

Figure 18B:
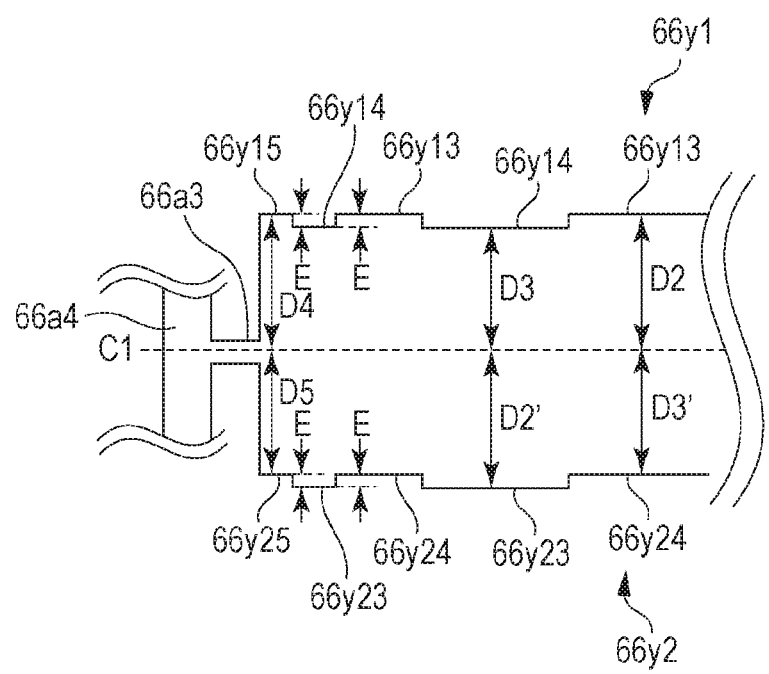
FIG. 18B is an enlarged view illustrating the metallic plate of a comparative example.

Subsequently, a device of layout of the straight areas 66c3 (see FIGS. 9A and 9B) on the shaft portion 66a will be described in detail with reference to FIG. 18A. FIGS. 18A and 18B are partial enlarged views illustrating the metallic plate 66a1 before being bent (enlarged view of the area corresponding to the end portion of the shaft portion).

The metallic plate 66a1 includes the long side 66y1 at one end portion thereof, and the long side 66y2 at the other end portion thereof. The metallic plate 66a1 is bent so that the long side 66y1 and the long side 66y2 oppose each other and formed into a cylindrical shape as described above. The mating portion 66c illustrated in FIG. 8 is an opposing area formed by the long side 66y1 and the long side 66y2 opposing each other.

The long side 66y1 includes straight portions 66y11 located at ends, a plurality of projections 66y13, and a plurality of depressions 66y14.

In the same manner, the long side 66y2 includes straight portions 66y21 located at ends, a plurality of projections 66y23 and a plurality of depressions 66y24.

The projections 66y13, the depressions 66y24, the projections 66y23, and the depressions 66y14 provided on the long side 66y1 and the long side 66y2 respectively correspond to an projection and depression area 66c1 (see FIGS. 9A and 9B) of the shaft portion 66a. In other words, the projection and depression area 66c1 is an area in which the plurality of projections 66y13 of the long side 66y1 and the plurality of projections 66y23 of the long side 66y2 are arranged alternately.

In the same manner, an area in which the straight portions 66y11 provided on the long side 66y1 and the straight portions 66y21 provided on the long side 66y2 oppose each other correspond to a straight area 66c3 (see FIGS. 9A and 9B) of the shaft portion 66a.

The straight portions 66y11, 66y12, 66y21, and 66y22 which correspond to the straight area 66c3 (see FIGS. 9A and 9B) are provided in parallel to a center line C1 of the cylindrical shaped portion 66a2.

The positions of the straight portion 66y11 and the straight portion 66y12 are configured so as to extend in substantially symmetry with respect to the center line C1 (a line so as to satisfy relationships D2=D2', and D3=D3') passing through the center of the cylindrical shaped portion 66a2 as follows.

A projecting amount F of the projections 66y13 projecting with respect to the long side 66y1 adjacent thereto is smaller than a projecting amount E of the projections 66y13 projecting with respect to the depressions 66y14 adjacent thereto (F<E). In the same manner, a depression amount F of the depressions 66y24 depressed with respect to the straight portion 66y12 adjacent thereto is smaller than a depressing amount E of the depressions 66y24 depressed with respect to the projections 66y23 adjacent thereto.

In this configuration, a distance D1 from the center line C1 to the straight portion 66y11 and a distance D1' from the center line C1 to the straight portion 66y12 become close values (substantially the same values). In other words, the arrangement of the straight portions 66y11 and 66y21 is symmetric with respect to the center line C1, and hence the degree of accuracy of processing when bending the cylindrical shaped portion 66a2 is stabilized.

In other words, if an attempt is made to bend the cylindrical shaped portion 66a2 by a die when the cylindrical shaped portion 66a2 is not symmetry, timing of coming into contact with the die may differ from each other between one side and the other side of the cylindrical shaped portion 66a2 with respect to the center line C1. If the cylindrical shaped portion 66a2 comes into contact with the die in such a case, the cylindrical shaped portion 66a2 may move with respect to the die.

In contrast, if the cylindrical shaped portion 66a2 is close to symmetry with respect to the center line C1, laterally uniform (lateral symmetry) bending with respect to the center line C1 is achieved.

In comparison, a configuration in which the arrangement of the straight portion is different from this example in the metallic plate (comparative example) is illustrated in FIG. 18B. A configuration of the charging roller 66 manufactured from the metallic plate illustrated in FIG. 18B is illustrated in FIG. 10.

In the configuration illustrated in FIG. 18B, which is the comparative example, a straight portion 66y15 projects with respect to the depressions 66y14 by the projecting amount E. A straight portion 66y25 is depressed with respect to the projections 66y23 by the depressing amount E. Consequently, a distance D5 from the center line C1 to the straight portion 66y25 is smaller than a distance D4 from the center line C1 to the straight portion 66y15 (D4>D5).

D4−D5=E is satisfied.

Consequently, in the comparative example in FIG. 18B, a symmetric property of the cylindrical shaped portion 66a2 is lost and hence the balance cannot be kept easily at the time of processing. In other words, when a force is applied when bending the metallic plate 66a1, the degree of accuracy of processing may be lowered due to the inclination of the cylindrical shaped portion 66a2.

Therefore, instead of the configuration as described in comparative example (FIG. 18B), it is preferable to keep a stress balance at the time of processing by arranging the straight portions 66y11 and the straight portion 66y12 at positions close to symmetry as described in this example (FIG. 18A).

In the comparative example illustrated in FIG. 10, the ratio of surface areas between the depressions and the projections is different at the end portions of the shaft portion 66a. However, in view of improvement of the degree of accuracy of processing, it is preferable to keep the ratio of the surface areas between the depressions and the projections as uniform as possible.

Therefore, in the configuration of this example, as illustrated in FIG. 14, in the cylindrical shaped portion 66a2, a sum of the surface areas of the projections 66y13 provided on the long side 66y1 and a sum of the surface areas of the projections 66y23 provided on the long side 66y2 are substantially equal. The expression "substantially equal" means that the sum of the surface areas of the projections 66y23 falls within ±4% of the sum of the surface areas of the projections 66y13.

A surface area S of the projection 66y13 is a value obtained by multiplying a width G1 (see FIG. 18A) of the projection 66y13 by the projecting amount E of the projections 66y13 (S=G1×E). The sum of the surface areas of the projections 66y13 is a sum of the surface areas of the respective projections 66y13.

The sum of the surface area of the projections 66y23 is obtained in the same manner.

In this manner, if the cylindrical shaped portion 66a2 is formed in symmetry with respect to the center line C1, the posture of the metallic plate 66a1 is stabilized when the cylindrical shaped portion 66a2 is processed, and the degree of accuracy of processing is improved. The dimensional accuracy of the shaft portion 66a in the radial and the longitudinal directions is stabilized. By using the shaft portion 66a with high dimensional accuracy as described above is used as the charging roller, a charging roller having a desirable charging function (charging performance) may be obtained.

In other words, if the accuracy of processing of the metallic shaft is improved, a cross section of the charging roller may be brought to be closer to an accurate circle. With the charging roller obtained in this manner, a photosensitive member may be charged uniformly at the time of rotation.

What is the most preferable as the shape of the cylindrical shaped portion 66a2 is the case where the projecting amount E of the projections become substantially equal among the projections 66y13 and the projections 66y23, and in addition, the value F becomes a substantially half the value E.

The expression "all of the projecting amounts E of the projections are substantially equal" means that when an average of the projecting amounts of the projections (66y13 and 66y23) is calculated, the projecting amounts of the respective projections with respect to the average value fall within a variation range of ±4% of the diameter of the shaft portion 66a.

Suppose that the diameter of the shaft portion 66a is 6.00 mm, 4% thereof is 0.24 mm. If the average value of the projecting amounts of the projections (66y13 and 66y23) is 2.00 mm, the projecting amounts of the respective projections 66y13 and 66y23 may fall within a range of 2.00±0.24 mm.

The expression "the value of F becomes a substantially half the value of E" means that the dimension of the actual F falls within the variation range of ±4% of the diameter of the shaft portion 66a with respect to the value F obtained by F=E/2.

Suppose that the diameter of the shaft portion 66a is 6.00 mm, 4% thereof is 0.24 mm. If the projecting amount E of the projections 66y13 adjacent to the straight portion 66y11 is 2.00 mm, the depression amount F of the straight portion 66y11 with respect to the projections 66y13 may fall within a range of 1.00±0.24 mm.

After the cylindrical shaped portion 66a2 has become the cylindrical shape in the metallic plate 66a1 and shaping is completed, the cylindrical shaped portion 66a2 is divided from the cross pieces 66a4 by cutting the connecting portions 66a3 in the metallic plate and a single shaft portion 66a is achieved.

In this case, as illustrated in FIG. 1, the connecting portions 66a3 remain on both end surfaces of the shaft portion 66a, and become projections (projecting portion) 66k projecting from the end surfaces of the shaft portion (cylindrical portion) 66a of the charging roller outward in the axial direction.

When viewing a cross section (cross section perpendicular to the axial line) of the shaft portion 66a manufactured in this manner, as illustrated in FIG. 8, a root portion of the projection 66k as a remaining portion of the connecting portions 66a3 comes to an opposite side of the straight areas 66c3 of a mating portion 66c with respect to a center (the axial line of the shaft portion) CL of the shaft portion 66a.

In other words, when viewing the shaft portion 66a from the axial direction of the shaft portion 66a, a straight line H connecting the straight areas 66c3 and the center (the axial line of the shaft portion) CL passes the projection 66k.

Characteristic of Projection 66k

Here, in this example, connecting surfaces 66k2 connecting an end surface 66a5 of the shaft portion of the charging roller and a projecting surface (end surface of the projection 66k) 66k1 are formed into inclined surfaces as illustrated in FIG. 16.

Accordingly, even though the connecting surfaces 66k2 come into contact with the charging roller bearing (bearing portion) 67 when the charging roller 66 rotates, abrasion of the charging roller bearing 67 may be reduced. Here, in this example, an outer diameter of the shaft portion 66a is (φ6 mm, the entire length in the axial direction C is 252.5 mm. However, the outer diameter and the entire length required in terms of function may be selected as needed.

A height 66L of the projecting surfaces from the end surface of the cylinder is 0.2 mm, a width 66M of the projecting surfaces is 1.5 to 2.5 mm, and an angle 66N of the inclined surfaces is 45 degrees.

However, these values may be selected as needed within a range of minimum dimensions which do not cause any problem in terms of manufacture.

As illustrated in FIG. 17, the connecting surfaces 66k2 configured to continuously connect the end surface 66a5 of the charging roller shaft portion and the projecting surface 66k1 projecting from the end surface of the charging roller shaft portion may be a combination of an inclined surface and a rounded surface.

In this case, the angle 66N of the inclined surface was set to 45 degrees and a dimension 66R of the rounded surface was R0.2 mm.

However, these values may be selected as needed within a range of dimensions which do not cause any problem in terms of manufacture.

Dimensions of 66M, 66N, and 66R are dimensions when cutting the metallic plate 66a1 before being bent into a cylindrical shape, and may be changed to some extent at the time of bending into the cylindrical shape. The projection 66k may be provided only at one end of the direction of axial line C depending on the manufacturing method.

The inclined surfaces are preferably provided on both sides when adding a processing load balance at the time of the press work, and the productivity when selecting the direction at the time of manufacture. However, it may be only one side on the front side in the direction of rotation of the charging roller.

Example 2

Figure 12A:
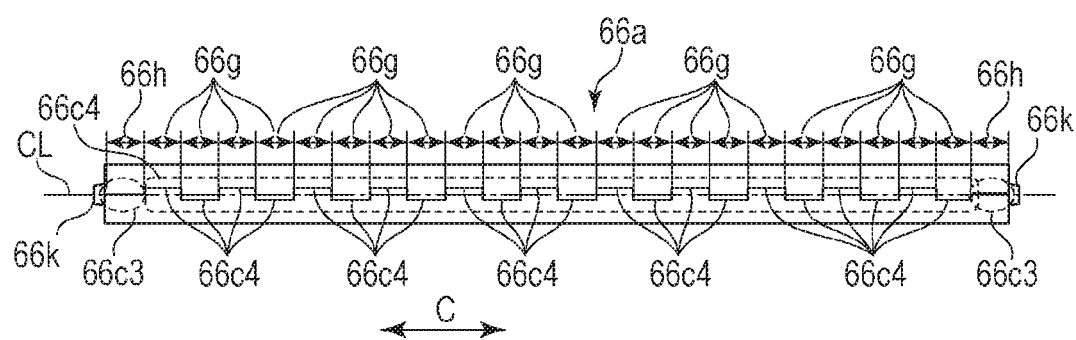
FIGS. 12A and 12B are explanatory views illustrating a charging roller of Example 2.
Figure 12B:
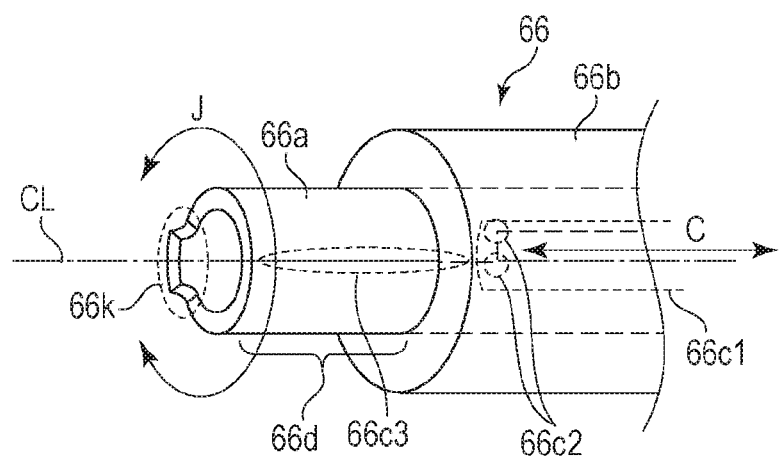

Referring now to FIGS. 12A and 12B, a configuration of Example 2 will be described. FIG. 12A is an explanatory view illustrating the shaft portion 66a. FIG. 12B is a detailed drawing illustrating the end portion of the charging roller 66.

Example 2 is the same as Example 1 in those other than the arrangement of the projection and depression area 66c1 of the mating portion in the axial direction C of the charging roller 66 and the dimensional relationship of a width 66g.

Here, a width 66f of each one of the projections and depressions (depressions or projections that form the projection and depression area) 66c4 of the projection and depression area 66c1 of the mating portion in the axial direction C of the charging roller 66 is set to be the same, and the projection and depression portion 66c4 are arranged equidistantly.

In this manner, by equalizing the width 66f, the same strength is achieved irrespective of the direction of twisting of the shaft portion 66a in a direction indicated by an arrow J. Accordingly, the direction of the axial direction C of the shaft does not need to be selected to use, the process of selecting the direction of the shaft is eliminated at the time of assembly, so that the cost may be reduced.

Example 3

Figure 13A:
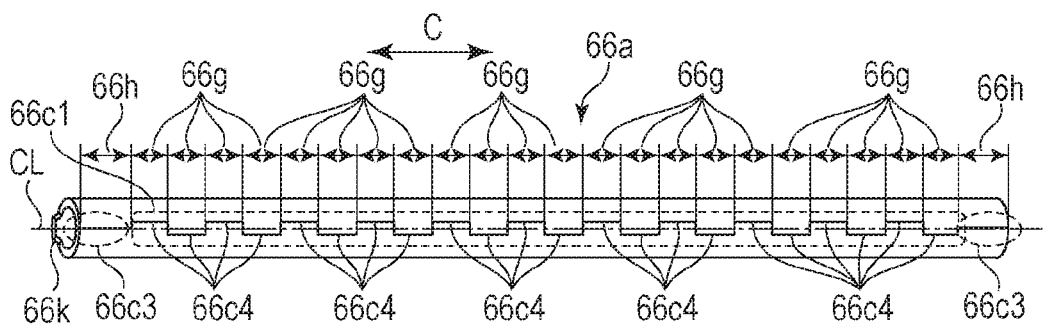
FIGS. 13A to 13C are explanatory views illustrating a charging roller of Example 3.
Figure 13B:
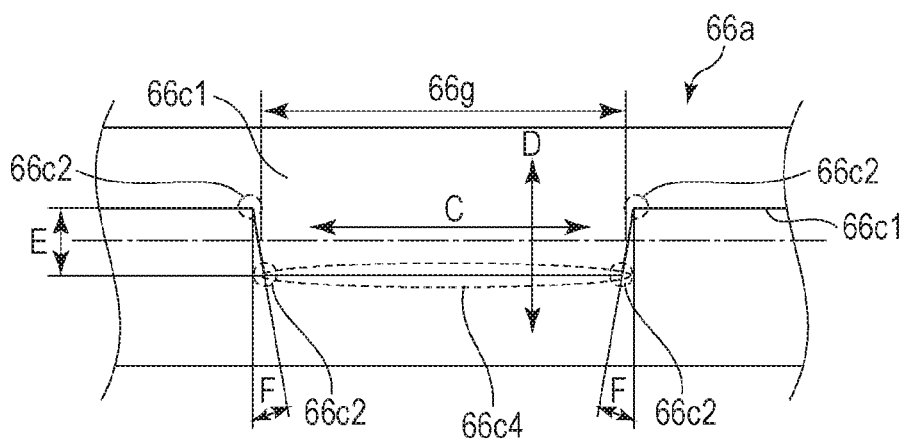
Figure 13C:
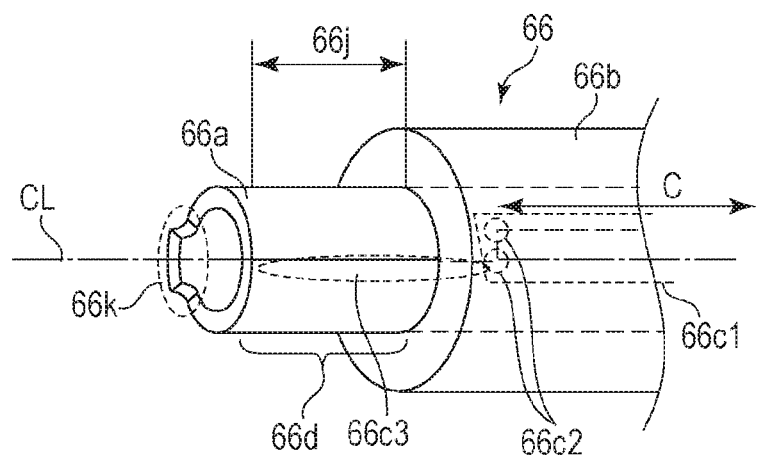

Referring now to FIGS. 13A to 13C, a configuration of Example 3 will be described. FIG. 13A is an explanatory view illustrating the shaft portion 66a. FIG. 13B is an explanatory view illustrating the projection and depression area 66c1. FIG. 13C is a detailed drawing illustrating the end portion of the charging roller 66.

Example 3 is the same as Example 2 in those other than the dimensional relationship between the width 66g of the projection and depression area 66c1 of the mating portion and the width 66h of the mating portion at the end portion in the axial direction C of the charging roller 66.

Configuration of Charging Roller

When defining the length and the width along the axial direction C of the charging roller 66, the width 66h of the straight areas 66c3 of the mating portion is longer than the width 66g of one projection (depression) of the projection and depression area 66c1.

In this example, the width 66h of the straight area 66c3 is set to 16 mm, and the width 66g of one projection (depression) of the projection and depression area 66c1 is set to 10.5 mm.

The width 66h of the straight area 66c3 may be set to 4 to 30 mm and the width 66g of one depression (projection) of the projection and depression area 66c4 may be set to a desired value, which is smaller than the width 66h of the straight area 66c3.

A width 66j of the end portion 66d illustrated in FIG. 13C is preferably at least on the order of 4 mm in order to secure the width of sliding movement with respect to the bearings

67L and 67R in the case where this part is used for manufacture or in terms of the product function. Therefore, the width 66h of the straight area 66c3 is also preferable to be at least 4 mm.

The projection and depression area 66c1 of the mating portion is inclined at the angle F with respect to the direction D perpendicular to the axial direction C of the shaft portion 66a. It is because that the projection and depression area can easily be mated in terms of manufacture. In this example, the value F is set to 3 degrees. However, a desired angle in a range from 0 to 10 degrees may be selected.

The outer diameter of the shaft portion 66a is φ6 mm, an inner diameter is φ4.8 mm. However, the outer diameter may be set as desired between 3 to 15 mm, and the inner diameter may be set as desired in a range obtained by subtracting a thickness (0.3 to 2 mm) of the metallic plate 66a1 from the outer diameter. The inner diameter does not have to be a circular shape if it is not required in terms of function of the product and manufacture.

The projecting amount (=depressing amount) E of the projection and depression area 66c1 and the projecting amount F of the straight areas 66c3 are the same in dimensional relationship and the value E is 2 mm, and the value F is 1 mm (not illustrated).

A projecting corner R, and a recessed corner R may be provided as needed at the corner portions 66c2. Although a configuration having no gap in engagement of the projections and the depressions at the mating portion is preferable in terms of strength, a gap may be partly generated.

By setting the width 66h of the straight area 66c3 to be larger than the width 66g of one projection and depression portion 66c4 in this manner, the length of the end portion 66d may be increased, so that a wide (long in the axial direction C) sliding portion with respect to the bearing may be secured.

In Examples 1 to 3 described above, an example in which the charging roller of this disclosure is assembled to the process cartridge has been described. However, this disclosure is not limited thereto, and the charging roller may be assembled to the image forming apparatus body in which a cartridge system is not employed. A configuration in which a minimum unit of only the charging roller can be mounted on and demounted from the process cartridge or the image forming apparatus body is also applicable.

In the respective examples, the charging roller 66 has been exemplified as the roller member. However, this disclosure is not limited thereto. For example, the roller member in which Examples are employed may be the developing roller 32.

The charging roller 66 and the developing roller 32 are conductive rollers (having an electric resistance of approximately $10^8 \Omega$ or lower), and are applied with a voltage at the time of image formation. However, the roller members having the shaft portion 66a of Examples are not limited thereto. The roller members to which the voltage is not applied at the time of image formation is also applicable, and a roller member covered with an insulative resilient member on an outer periphery of the shaft portion 66a.

In the charging roller 66, the shaft portion 66a is covered with the resilient member (the covering member). However, such a covering member is not essential. In other words, the simple term "roller member" in this disclosure may include the case of indicating the shaft portion 66a itself.

There may be the case where the shaft portion 66a itself is used as the roller member in the image forming apparatus, and there may be the case where the shaft portion 66a provided with the covering member such as the resilient member mounted on the outer periphery thereof is used as the roller member.

In conclusion, summary of the common advantages of Examples described thus far will be described below. Therefore, according to a configuration of respective Examples disclosed in this application, in the metallic shaft provided with the depressions and the projections of the metallic plate in the opposing area where the one end portion and the other end portion oppose each other, restraint of lowering of the dimensional accuracy of the metallic shaft is achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A roller member used in an image forming apparatus comprising: a metallic shaft,
   the metallic shaft including:
   a cylindrical portion formed so that one end portion and the other end portion of a metallic plate oppose each other, wherein:
   the one end portion and the other end portion each include a straight portion, a plurality of projections, and a plurality of depressions,
   the projections on the one end portion engage the depressions on the other end portion, the depressions on the one end portion engage the projections on the other end portion, and the straight portion on the one end portion oppose the straight portion on the other end portion in an opposing area in which the one end portion and the other end portion oppose,
   a straight area in which the straight portion of the one end portion and the straight portion of the other end portion oppose is positioned on an end portion of the cylindrical portion in the axial direction,
   a projection and depression area in which the projections on the one end portion and the projections on the other end portion are arranged alternately is located adjacent to the straight area in the axial direction,
   a projecting amount of the projection on the metallic plate projecting with respect to the straight portion to which the projection arranged so as to be interposed between the straight portion and the depression is adjacent is smaller than a projecting amount on the metallic plate of the projection projecting with respect to the depression to which the projection is adjacent,
   in a case where a straight line passing thorough a midpoint of the straight portion on the one end portion and the straight portion on the other end portion and parallel to the axial direction is a center line, a distance from the center line to the straight portion of the one end portion is equal or substantially equal to a distance from the center line to the straight portion of the another end portion on the metallic plate, and
   wherein, on the metallic plate, a distance from the center line to the projections of the one end portion is equal to a distance from the center line to the projections of the another end portion, and a distance from the center line to the depressions of the one end portion is equal to a distance from the center line to the depressions of the another end portion.

2. The roller member according to claim 1, wherein the projecting amount of the projection projecting with respect to the straight portion to which the projection arranged so as to be interposed between the straight portion and the depression is adjacent is substantially a half the projecting amount of the projection projecting with respect to the depression to which the projection is adjacent.

3. The roller member according to claim 1, wherein the number of projections provided on the one end portion and the number of projections provided on the other end portion are equal.

4. The roller member according to claim 1, wherein projecting amounts of the plurality of projections provided on the one end portion and on the other end portion are substantially the same.

5. The roller member according to claim 1, wherein widths of the plurality of projections provided on the one end portion and on the other end portion in the axial direction are substantially the same.

6. The roller member according to claim 1, wherein a sum of surface areas of the projections on the one end portion and a sum of surface areas of the projections on the other end portion are substantially equal.

7. The roller member according to claim 1, wherein the roller member is a charging roller configured to charge an image bearing member configured to bear an image.

8. The roller member according to claim 1, wherein the roller member is a developing roller configured to develop a latent image formed on the image bearing member.

9. A roller supporting mechanism comprising
a roller member having a metallic shaft including:
a cylindrical portion formed so that one end portion and the other end portion of a metallic plate oppose each other; and
a bearing portion configured to rotatably support the roller member,
wherein
the one end portion and the other end portion each include a straight portion, a plurality of projections, and a plurality of depressions,
the projections on the one end portion engage the depressions on the other end portion, the depressions on the one end portion engage the projections on the other end portion, and the straight portion on the one end portion oppose the straight portion on the other end portion in an opposing area in which the one end portion and the other end portion oppose,
a straight area in which the straight portion of the one end portion and the straight portion of the other end portion oppose is positioned on an end portion of the cylindrical portion in the axial direction,
a projection and depression area in which the projections on the one end portion and the projections on the other end portion are arranged alternately is located adjacent to the straight area in the axial direction,
a projecting amount of the projection on the metallic plate projecting with respect to the straight portion to which the projection arranged so as to be interposed between the straight portion and the depression is adjacent is smaller than a projecting amount of the projection on the metallic plate projecting with respect to the depression to which the projection is adjacent, and
in a case where a straight line passing thorough a midpoint of the straight portion on the one end portion and the straight portion on the other end portion and parallel to the axial direction is a center line, a distance from the center line to the straight portion of the one end portion is equal or substantially equal to a distance from the center line to the straight portion of the another end portion on the metallic plate,
wherein, on the metallic plate, a distance from the center line to the projections of the one end portion is equal to a distance from the center line to the projections of the another end portion, and a distance from the center line to the depressions of the one end portion is equal to a distance from the center line to the depressions of the another end portion.

10. The roller supporting mechanism according to claim 9, wherein the projecting amount of the projection projecting with respect to the straight portion to which the projection arranged so as to be interposed between the straight portion and the depression is adjacent is substantially a half the projecting amount of the projection projecting with respect to the depression to which the projection is adjacent.

11. The roller supporting mechanism according to claim 9, wherein the number of projections provided on the one end portion and the number of projections provided on the other end portion are equal.

12. The roller supporting mechanism according to claim 9, wherein projecting amounts of the plurality of projections provided on the one end portion and on the other end portion are substantially the same.

13. The roller supporting mechanism according to claim 9, wherein widths of the plurality of projections provided on the one end portion and on the other end portion in the axial direction are substantially the same.

14. The roller supporting mechanism according to claim 9, wherein a sum of surface areas of the projections on the one end portion and a sum of surface areas of the projections on the other end portion are substantially equal.

15. The roller supporting mechanism according to claim 9, wherein the roller member is a charging roller configured to charge an image bearing member configured to bear an image.

16. The roller supporting mechanism according to claim 9, wherein the roller member is a developing roller configured to develop a latent image formed on the image bearing member.

17. The roller supporting mechanism according to claim 9, wherein the roller supporting mechanism is mounted on and demounted from an apparatus body of the image forming apparatus as part of a cartridge.

18. An image forming apparatus configured to form an image on a recording medium comprising:
the roller supporting mechanism according to claim 9; and
a conveyance mechanism configured to convey the recording medium.

* * * * *